United States Patent
McCollum

(10) Patent No.: US 10,026,334 B2
(45) Date of Patent: Jul. 17, 2018

(54) BURN PLAQUE AND IGNITER SYSTEM FOR FIRE TRAINERS

(71) Applicant: Robert P. McCollum, Transfer, PA (US)

(72) Inventor: Robert P. McCollum, Transfer, PA (US)

(73) Assignee: Kirila Fire Training Facilities, Inc., Brookfield, OH (US)

( * ) Notice: Subject to any disclaimer, the term of this patent is extended or adjusted under 35 U.S.C. 154(b) by 278 days.

(21) Appl. No.: 14/986,970

(22) Filed: Jan. 4, 2016

(65) Prior Publication Data
US 2017/0193849 A1    Jul. 6, 2017

(51) Int. Cl.
*G09B 19/00*    (2006.01)

(52) U.S. Cl.
CPC .................... *G09B 19/00* (2013.01)

(58) Field of Classification Search
USPC .................................................. 434/219, 226
See application file for complete search history.

(56) References Cited

U.S. PATENT DOCUMENTS

| | | | | | |
|---|---|---|---|---|---|
| 4,303,396 | A * | 12/1981 | Swiatosz | ............ | A62C 99/0081 434/226 |
| 4,983,124 | A * | 1/1991 | Ernst | .................. | A62C 99/0081 434/226 |
| 5,233,869 | A * | 8/1993 | Rogers | ............... | A62C 99/0081 340/604 |
| 5,275,571 | A * | 1/1994 | Musto | ................ | A62C 99/0081 434/219 |
| 5,374,191 | A * | 12/1994 | Herman | ............. | A62C 99/0081 434/226 |
| 5,411,397 | A * | 5/1995 | Rogers | ............... | A62C 99/0081 434/226 |
| 5,447,437 | A * | 9/1995 | Joynt | ................. | A62C 99/0081 434/226 |
| 5,700,141 | A * | 12/1997 | Miller | ..................... | F23Q 3/006 431/125 |
| 6,155,837 | A * | 12/2000 | Korneliussen | ..... | A62C 99/0081 40/406 |
| 6,802,718 | B2 * | 10/2004 | Musto | .................... | G09B 19/00 434/219 |
| 6,866,513 | B2 * | 3/2005 | Hough | ..................... | G09B 9/00 434/226 |
| 7,744,373 | B2 * | 6/2010 | Williamson | ....... | A62C 99/0081 434/226 |
| 8,192,202 | B2 * | 6/2012 | Schutte | .................. | G09B 19/00 434/226 |

* cited by examiner

*Primary Examiner* — Kurt Fernstrom
(74) *Attorney, Agent, or Firm* — Renner, Kenner, Greive, Bobak, Taylor & Weber Co., L.P.A.

(57) ABSTRACT

A system is presented for training emergency personnel in the control, containment, and extinguishment of fires. The system includes an array of waterless burn plaques in selective communication with a pressurized source of combustible gas, such as propane. A flameless igniter is associated with each burn plaque, each flameless igniter igniting the combustible gas emitted from the associated burn plaque. When activated, the igniter is continuously operating, emitting electrical sparks across a gap between electrodes and operating substantially unaffected by its environment. Being waterless, the burn plaques are of a low profile and present minimal interference with trainees maneuvering thereabout.

14 Claims, 7 Drawing Sheets

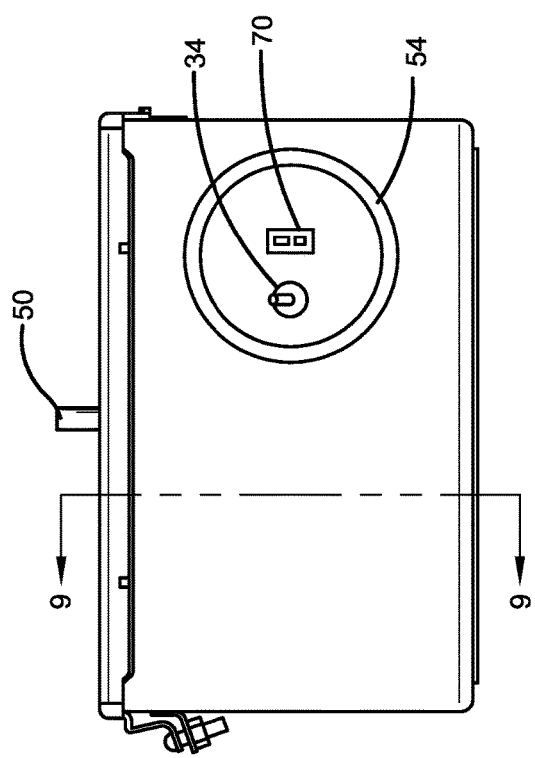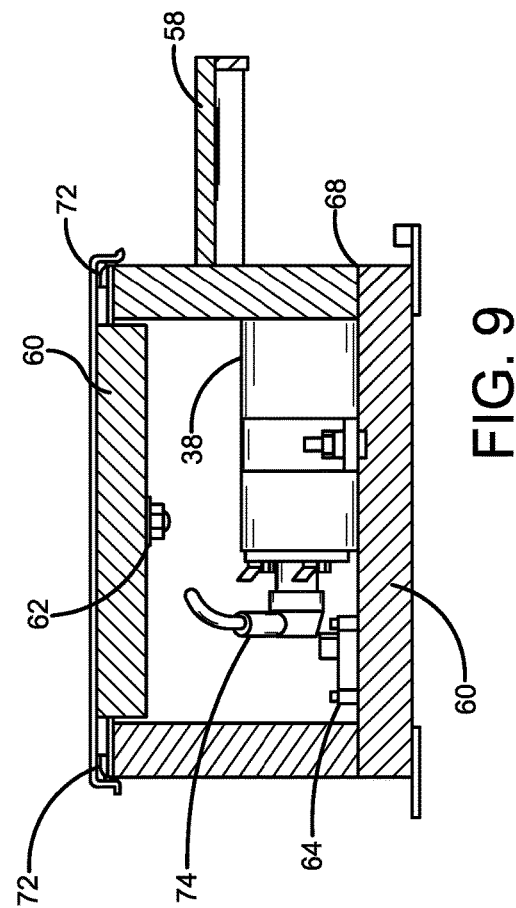

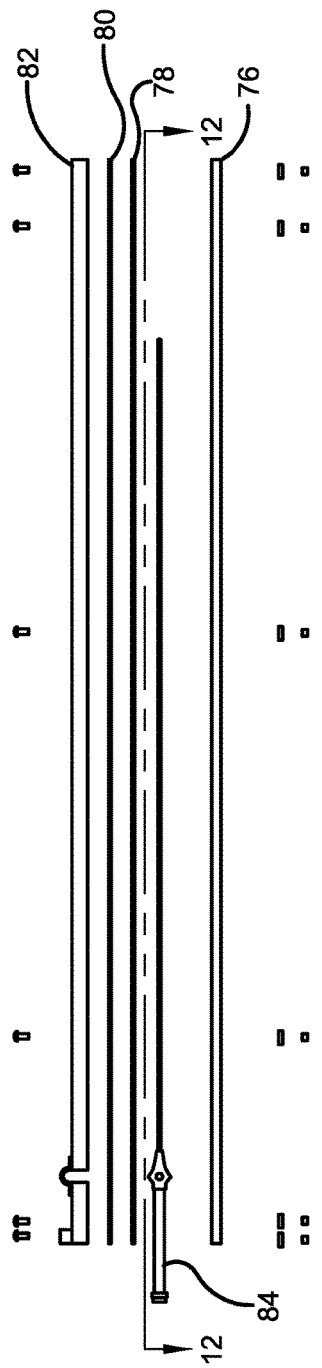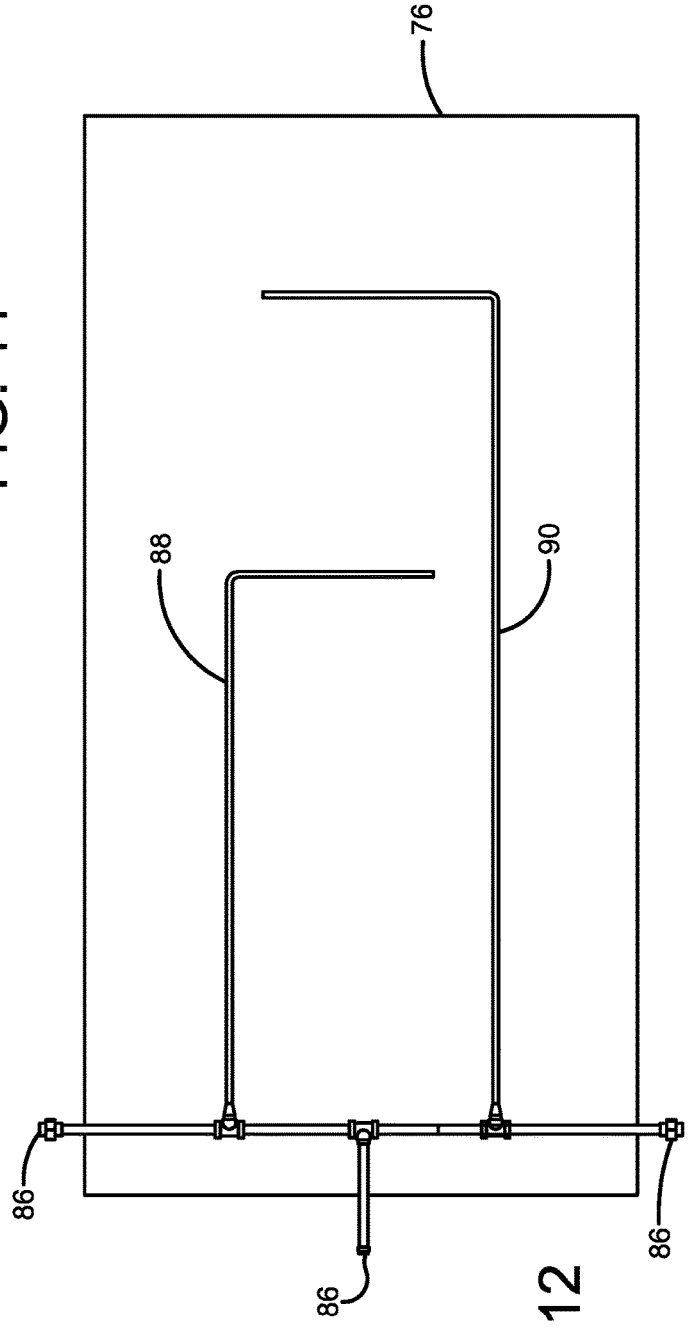

BURN PLAQUE AND IGNITER SYSTEM FOR FIRE TRAINERS

FIELD OF THE INVENTION

The invention herein resides in the art of training devices for rescue, control, recovery, and management efforts in live fire situations. Particularly, the invention relates to fire igniters and associated burn plaques used in such training devices. Specifically, the invention relates to a transportable, wireless, electronic, flameless igniter ensuring the ignition of flames regardless of ambient conditions, and a waterless, low-profile burn plaque.

BACKGROUND OF THE INVENTION

Fire training devices are widely used to train emergency personnel how to perform necessary tasks in an environment engulfed in flames. The state of the art has replicated buildings, vehicles, aircraft, industrial sites and the like that are subjected to controlled and regulated activation of live flames at selected locations in the replicated structure.

In general, the art has employed plumbed and wired training structures with fixed propane gas lines connected to burners in designated areas. The burners have been of a wide variety of types and are typically connected to an igniter, which has a pilot light flame engaging a thermocouple or the like to keep valved gas flow available to the burner so long as the thermocouple senses that the pilot light is lit. The burner itself, and particularly the pilot light igniter, operates in a harsh environment, necessarily exposed to high-pressure water or chemical spray, foam or the like. While the pilot light is typically shielded and baffled from the spray and foam, failures of the pilot are not uncommon, and such failures tend to diminish the effectiveness of the training session with flames being prematurely or inadvertently extinguished.

In the prior art, the burners have typically been in the nature of a water tray having propane gas lines passing therethrough with apertures allowing for the propane gas to bubble through the water and out of a fire grid, ignited by the igniter flame. These burner trays are problematic in that they are not low profile, but rather on the order of several inches in height in order to accommodate the passing gas line and water bath. Being of such a profile, they provide an impediment to the trainee having to maneuver thereover. Moreover, the water tray necessarily requires refilling, and the structure and size of the water tray burner is such that it is not given to ease of placement, repositioning or replacement.

The hard-wired and plumbed nature of the prior art igniters and burner trays, combined with a lack of reliability of the igniter and the physical size and impediment of the water tray burner, has greatly limited the utility of these prior art structures and associated systems. Accordingly, there is a need in the art for a fire trainer igniter that is flameless, portable, and given to ease of placement at any of numerous desired locations in a fire trainer. There is an additional need in the art for a burner or burn plaque that is waterless, of low profile, and capable of effectively distributing the gas over a defined region in a substantially uniform and controlled manner, the burn plaque being given to ease of positioning and connection and disconnection with an associated gas line in a fire trainer.

SUMMARY OF THE INVENTION

In light of the foregoing, it is a first aspect of the invention to provide a burn plaque and igniter system for fire trainers in which the igniter is flameless.

Another aspect of the invention is the provision of a burn plaque and igniter system for fire trainers in which the igniter is electronic and substantially impervious to the adverse effects of the environment in which it operates.

A further aspect of the invention is the provision of a burn plaque and igniter system for fire trainers in which the igniter is rechargeable and transportable.

Still a further aspect of the invention is the provision of a burn plaque and igniter system for fire trainers in which the burn plaque is waterless.

Yet another aspect of the invention is the provision of a burn plaque and igniter system for fire trainers in which the burn plaque is low profile, providing little physical obstruction to trainees.

Another aspect of the invention is the provision of a burn plaque and igniter system for fire trainers, which provides dispersion of gas substantially uniformly through a fiberglass roving mat.

Yet a further aspect of the invention is to provide a burn plaque and igniter system for fire trainers that is reliable and durable in use, easy to manipulate in the field, and easily constructed with state-of-the-art materials and devices.

DISCLOSURE OF INVENTION

The foregoing and other aspects of the invention that will become apparent as the detailed description proceeds are achieved by: a fire trainer system, comprising an array of waterless burn plaques in selective communication with a source of combustible gas; and a flameless igniter associated with at least certain of the burn plaques, each said flameless igniter igniting said combustible gas emitted from said associated burn plaque.

DESCRIPTION OF DRAWINGS

For a complete understanding of the various aspects of the invention, reference should be made to the following detailed description and accompanying drawings wherein:

FIG. 8 is a sectional view of the igniter box of FIG. 5 taken along the line 8-8;

FIG. 9 is a sectional view of the igniter box as shown in FIG. 8 taken along the line 9-9;

FIG. 11 is a side elevational assembly diagram of the burn plaque of the invention; and FIG. 12 is a top plan view of the burn plaque assembly of FIG. 11 taken along the plane of 12-12.

DETAILED DESCRIPTION OF ILLUSTRATIVE EMBODIMENTS

Figure 1:
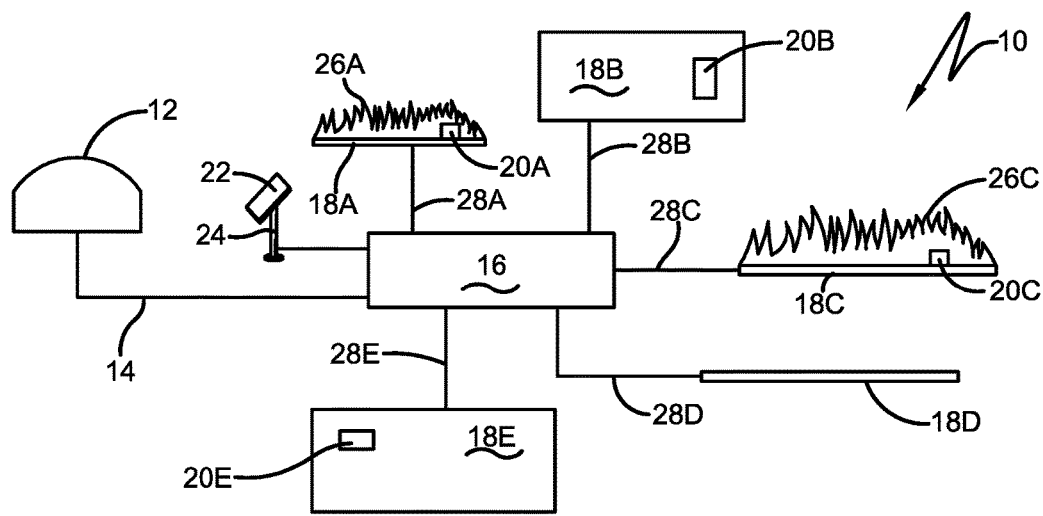
FIG. 1 is an illustrative view of a fire trainer system employing burn plaques and igniter systems according to the invention.

Referring now to the drawings and more particularly FIG. 1, it can be seen that a fire trainer system made in accordance with the invention is shown schematically and designated generally by the numeral 10. The system 10 relies upon a pressurized propane gas source 12 connected by a conduit 14 to a valved manifold 16. A plurality of waterless burn plaques 18A-18E are in controlled communication with the pressurized propane gas source 12 through the valved manifold 16. Transportable, wireless and flameless igniter boxes 20 are provided in association with selected burn plaques 18 to ignite propane or other combustible gas being emitted from the burn plaques. As shown in FIG. 1, there are five burn plaques 18A-18E positioned in the system 10. For a particular training exercise, less than all five of the plaques may be employed. As depicted in FIG. 1, only burn plaques 18A-18C and 18E are used in the exercise and, accordingly, burn plaque 18D need not be provided with a transportable, wireless igniter box 20. Alternatively, an igniter box 20D might be placed in association with the burn plaque 18D, but simply not be actuated for the training session.

An operator control panel 22 is maintained atop a panel stand 24 and is in controlling communication with the valves of the valved manifold 16 such that an operator may selectively open and shut the valves to selectively allow gas to pass to desired ones of the plaques 18. When gas passes to a burn plaque 18, a flame ignites across the plaque, as shown in association with burn plaques 18A and 18C in the drawing of FIG. 1. As will become apparent below, prior to a training session, the igniters 20 associated with the plaques 18 to be employed will be activated such that when gas passes to the associated plaque 18, the gas is ignited and causes flames to rise. Gas conduits 28A-28E pass from respectively associated valves of the manifold 16 to an associated burn plaque. It will be appreciated that while the drawing shows hard wiring interconnection between the control panel 22 and valved manifold 16, the invention contemplates radiofrequency (RF) communication, as well. Indeed, the control panel 22 and manifold 16 may include RF transponders for communication of control and data signals between the two, such data signals confirming value actuation, temperatures and the like.

It will thus be appreciated that the system of FIG. 1 allows for the establishment of an array of burn plaques, each burn plaque to be employed in a given exercise being provided with an igniter that is actuated prior to the exercise. The operator, through control panel 22, then selects the sequence and combination of burn plaques to be activated by regulating the valves of the valved manifold 16 to pass gas to associated burn plaques 18. Alternatively, a programmed system may be employed. The invention also contemplates that a pair of burn plaques 18 may be in sufficient proximity to be serviced by a single igniter 20. Specifically, burn plaques 18 may be ganged together.

Figure 2:
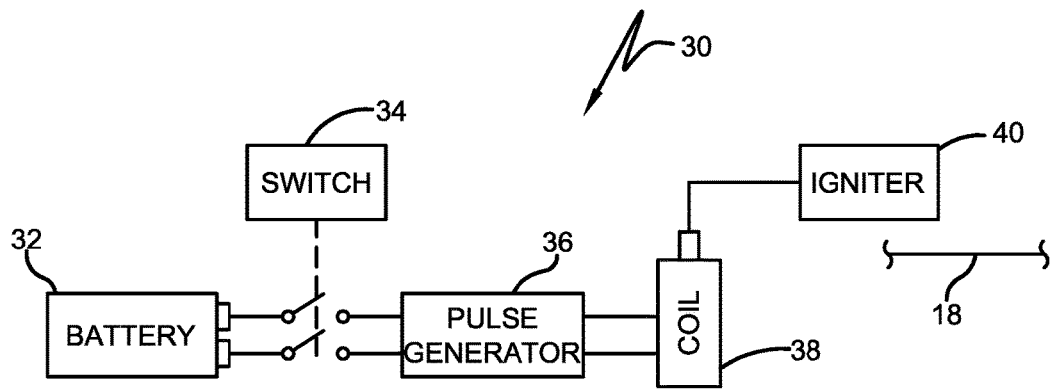
FIG. 2 is a block diagram schematic of the igniter made in accordance with the invention.

With reference to FIG. 2, there can be seen a circuit schematic of the transportable, wireless igniter boxes 20 employed with the invention. The circuit is designated generally by the numeral 30 and includes a battery, such as a 6-volt DC battery, that is selectively connected by means of a switch 34 to an appropriate pulse generator 36, the pulse generator 36 operating at a preset or preselected duty cycle, emitting signals of a set amplitude and frequency. The pulses from the pulse generator 36 are passed to a high-voltage ignition coil 38, which produces high-voltage output pulses to an igniter 40. According to a preferred embodiment of the invention, the pulse generator 36 causes the high-voltage signals from the coil 38 to pass to the igniter 40 at a frequency on the order of 200 hertz or cycles per second. The igniter 40 presents an electrical arc over a small air gap, much like a spark plug, the spark serving to ignite the gas passing from a burn plaque 18 with which it is in close proximity. Of course, the operator controls whether gas is passed to any particular burn plaque by means of the control panel 22 regulating the valves of the valved manifold 16.

Figure 3:
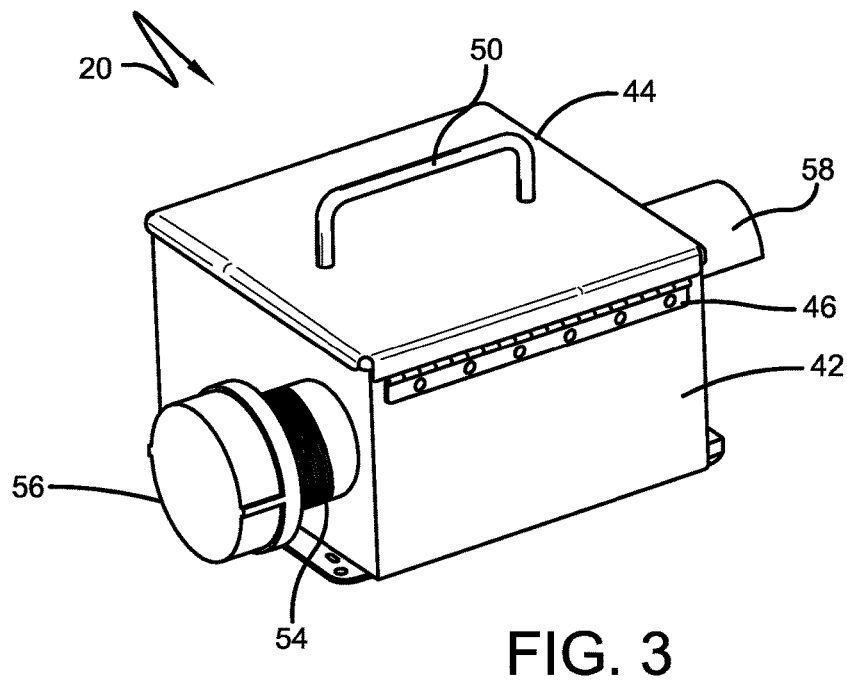
FIG. 3 is a perspective view of the igniter box of the invention taken from above the device.
Figure 4:
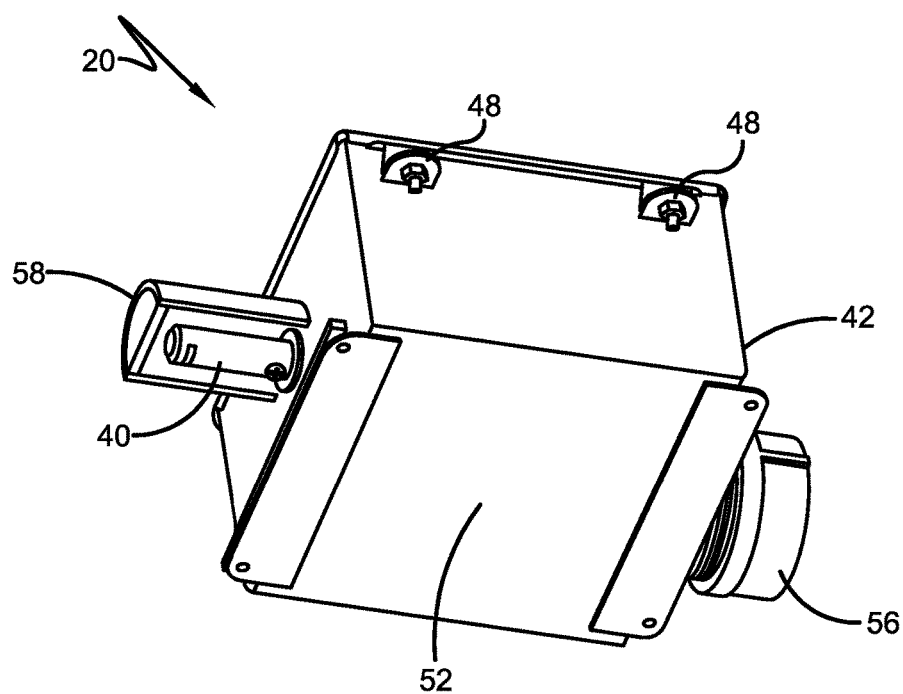
FIG. 4 is a perspective view of the igniter box of FIG. 3 taken from below the device.
Figure 5:
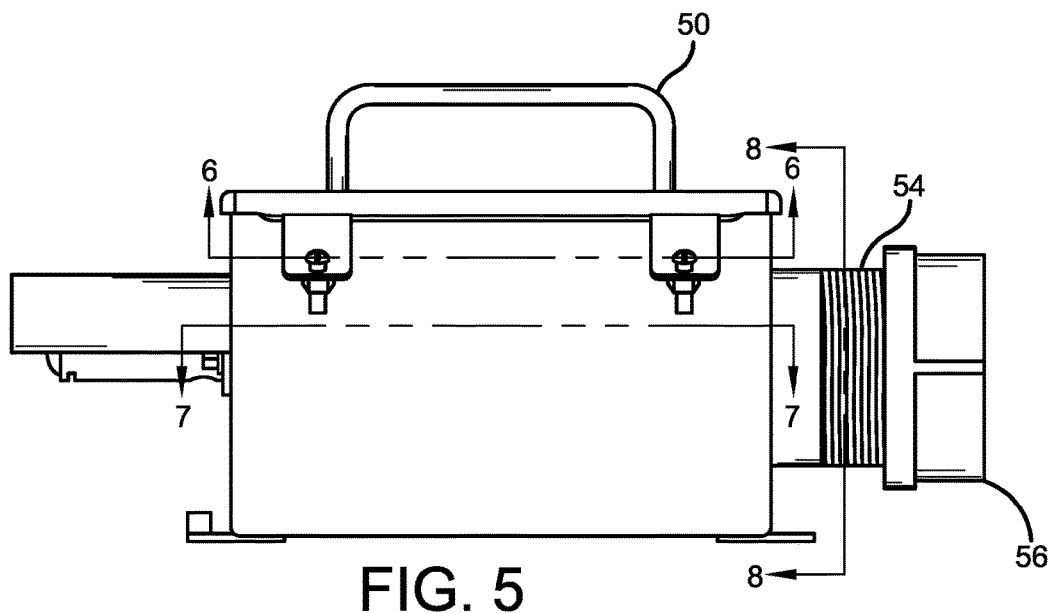
FIG. 5 is a front elevational view of the igniter box of the invention.

Referring now to FIGS. 3 and 4, it can be seen that the physical structure of the transportable, wireless igniter box 20 is designated generally by the numeral 42. The box 42 is of heavy metal construction and has a top 44, which may be opened to gain access to the interior of the box by means of a piano hinge 46 with latch and catch assemblies 48 on the opposite side thereof. A carry handle 50 is centrally positioned on the top 44 and may either be welded thereto or secured by means of lock nuts or the like. A base 52 finishes the enclosure of the box 42 and is provided with a peripheral flange for securing the box 42 at any particular location.

The box 42 includes a threaded nipple 54 welded or otherwise appropriately affixed on one side of the box 42. The threaded nipple 54 may be closed by a threaded cap 56. As will be discussed later on, sealingly secured within the confines of the nipple 54 are the on/off switch 34 and the connectors for charging of the battery 32.

On the side of the box 42 opposite the nipple and cap 54, 56 is a semi-cylindrical capped shield 58, which is also welded or otherwise appropriately affixed to the box 42. An igniter 40 protrudes from the side of the box 42 and within the semi-cylindrical shield 58, as best shown in FIG. 4. As discussed above, the igniter 40 is a spark gap member, functioning much like a spark plug, providing an electrical spark across a pair of contacts, the arc causing gas ignition.

Figure 6:
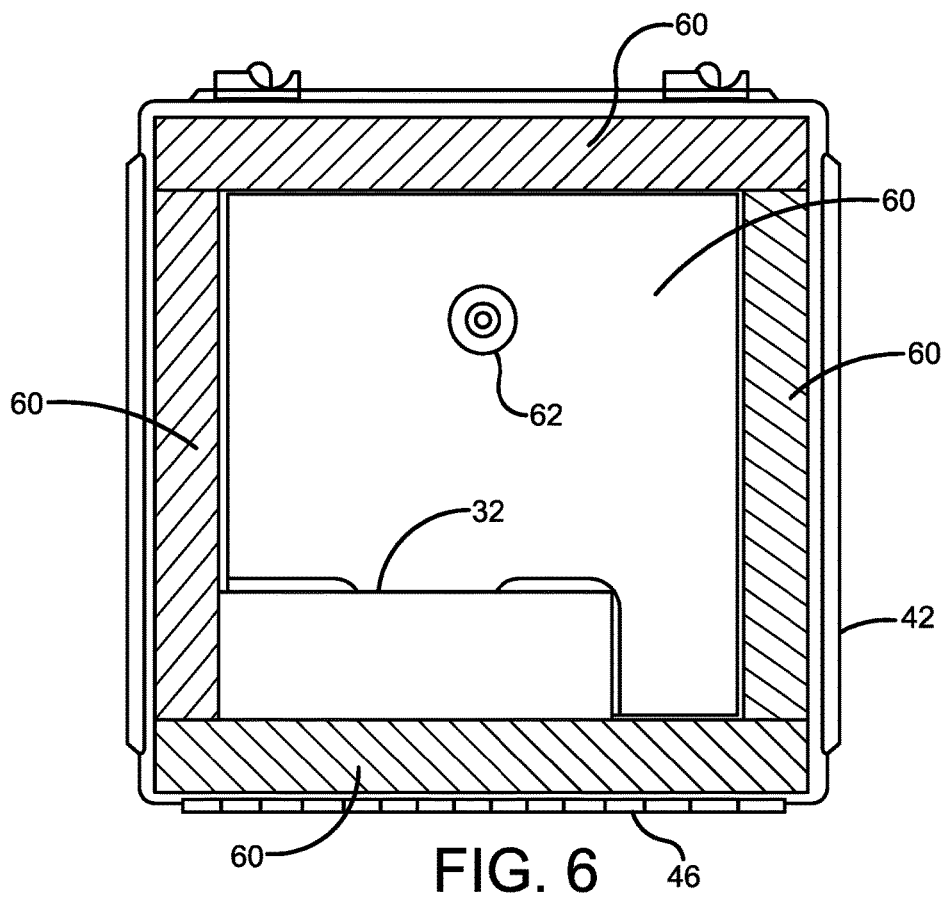
FIG. 6 is a sectional view of the igniter box of FIG. 5 taken along the line 6-6.
Figure 7:
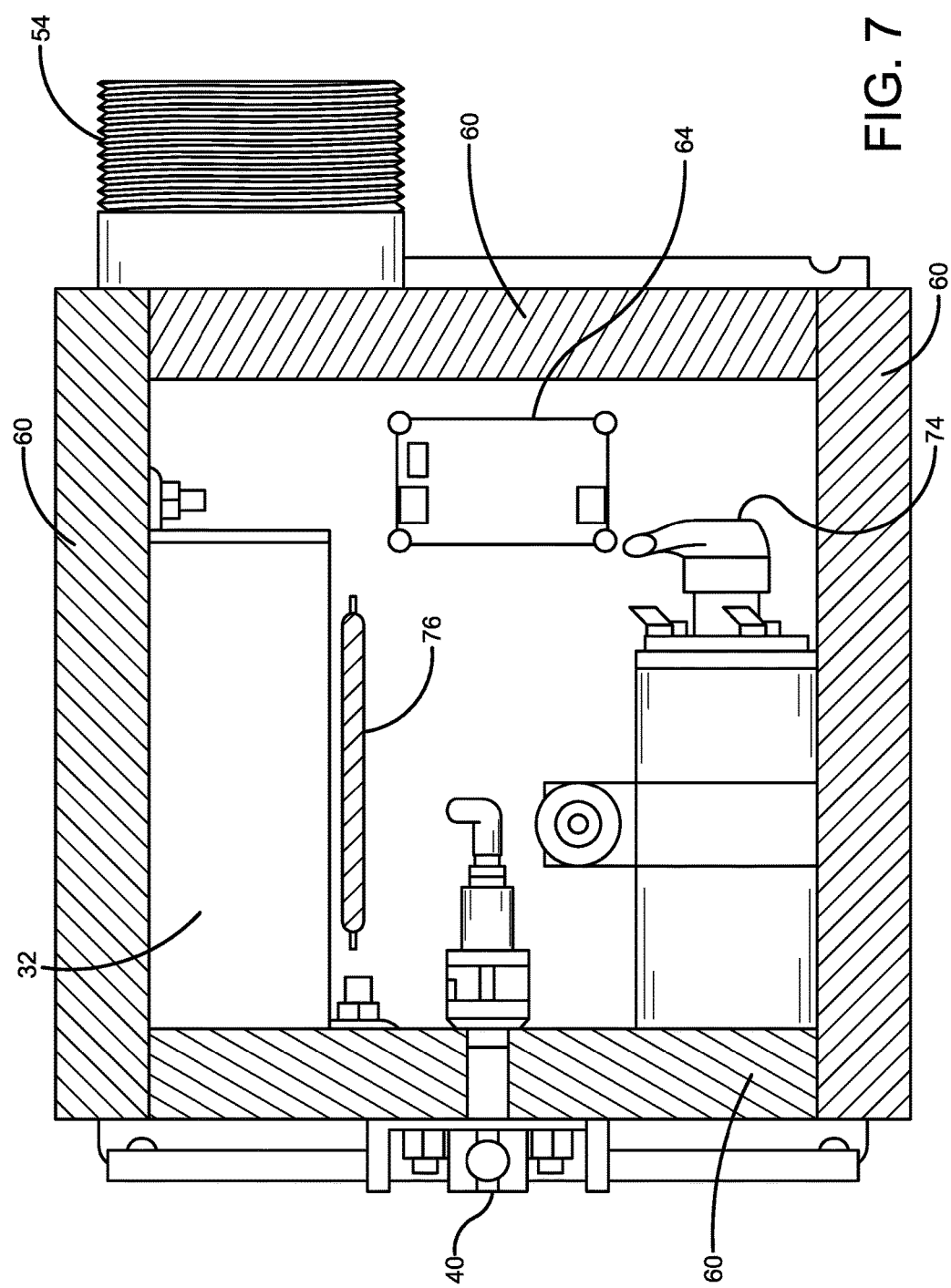
FIG. 7 is a sectional view of the igniter box of FIG. 5 taken along the line 7-7.

With reference now to FIGS. 5-9, an appreciation can be had with regard to the particular structure of the box 42, its contents and functionality. In those drawings, the welded metal fabrication of the sides and base 52 of the box 42, taken in conjunction with the hinged and latched top 44, can be seen. As best shown in FIGS. 6, 7 and 9, it can be seen that a fireproof liner of appropriate material, such as calcium silicate, covers the base, sides, and underside of the box 42 over the entirety of the interior thereof. Calcium silicate is commonly used in burn rooms and the like as a fire barrier. The gaps between the calcium silicate liner panel 60 on the sides and base of the box 42 are sealed with a high-temperature cement of an appropriate nature. With the lid 44 also having a fireproof liner attached thereto, the box 42 defines a fireproof interior chamber.

As shown in FIG. 6, a lock washer and nut combination may secure the handle 50 as it passes through the top 44, although it will be appreciated that the handle 50 may be affixed externally as by an appropriate weldment. Also shown in FIG. 6 is the top portion of the battery 32.

In FIG. 7, it can be seen that a circuit board and heat sink 64 is provided within the cavity of the box 42 to receive the pulse generator 36. A desiccant 76, also shown in FIG. 7, may be placed within the cavity to keep it dry. Also received within the cavity of the box 42 is the igniter 40, coil 38, and battery 32. These elements are interconnected in the manner shown FIG. 2.

FIG. 9 shows that a floor plate 68 is positioned atop the base fireproof liner 60 and is adapted to receive clamps or screws for maintaining elements such as the circuit board and heat sink 64 and ignition coil 38.

FIG. 8 shows the nipple 54 as it is welded to the side of the box 42 and maintains within the cylinder thereof the on/off switch 34 and a connector pair 70 to connect the battery 32 to an appropriate external charger for purposes of recharging the battery of the portable igniter box.

As best shown in FIG. 9, a high-temperature, extruded gasket compound 72 is employed about the periphery of the box 42 and interposed between the top edges of the fireproof liner panels 60 and the engaging edge of the top 44 to further seal the interior of the box 42.

The tower of the coil 38 is shown with a high-voltage coil tower wire 74, which extends to and interconnects the igniter 40, as shown in FIGS. 2, 7 and 9.

It should now be appreciated that transportable, wireless igniter boxes 20 comprise a sealed metallic box with battery-powered circuitry therein for generating a high-voltage pulse from a pulse generator 36 to the coil 38, with the pulse from the coil 38 being of sufficient amplitude to generate a spark across contacts of the igniter 40. When the switch 34 is turned on, the sparks across the gap are continuous at a preset frequency, which is preferably on the order of 150-250 cycles per second, and most preferably on the order of 200 cycles per second. When propane gas is exposed to the open spark, positioned beneath the semi-cylindrical shield 58, the propane gas is caused to ignite. Because the spark is continuous and shielded, it is extremely unlikely that anything can preclude the spark from occurring, even when subjected to water and/or chemical spray of high intensity/velocity. Accordingly, any gas present in the region of the igniter 40 will necessarily be ignited. Moreover, even when the box is subjected to high-temperature flames and/or water or chemical spray, the box itself is substantially impervious to these ambient conditions and the battery, coil and associated circuitry maintained therein have been found to operate continuously in such an environment when the switch 34 is activated.

Figure 10:
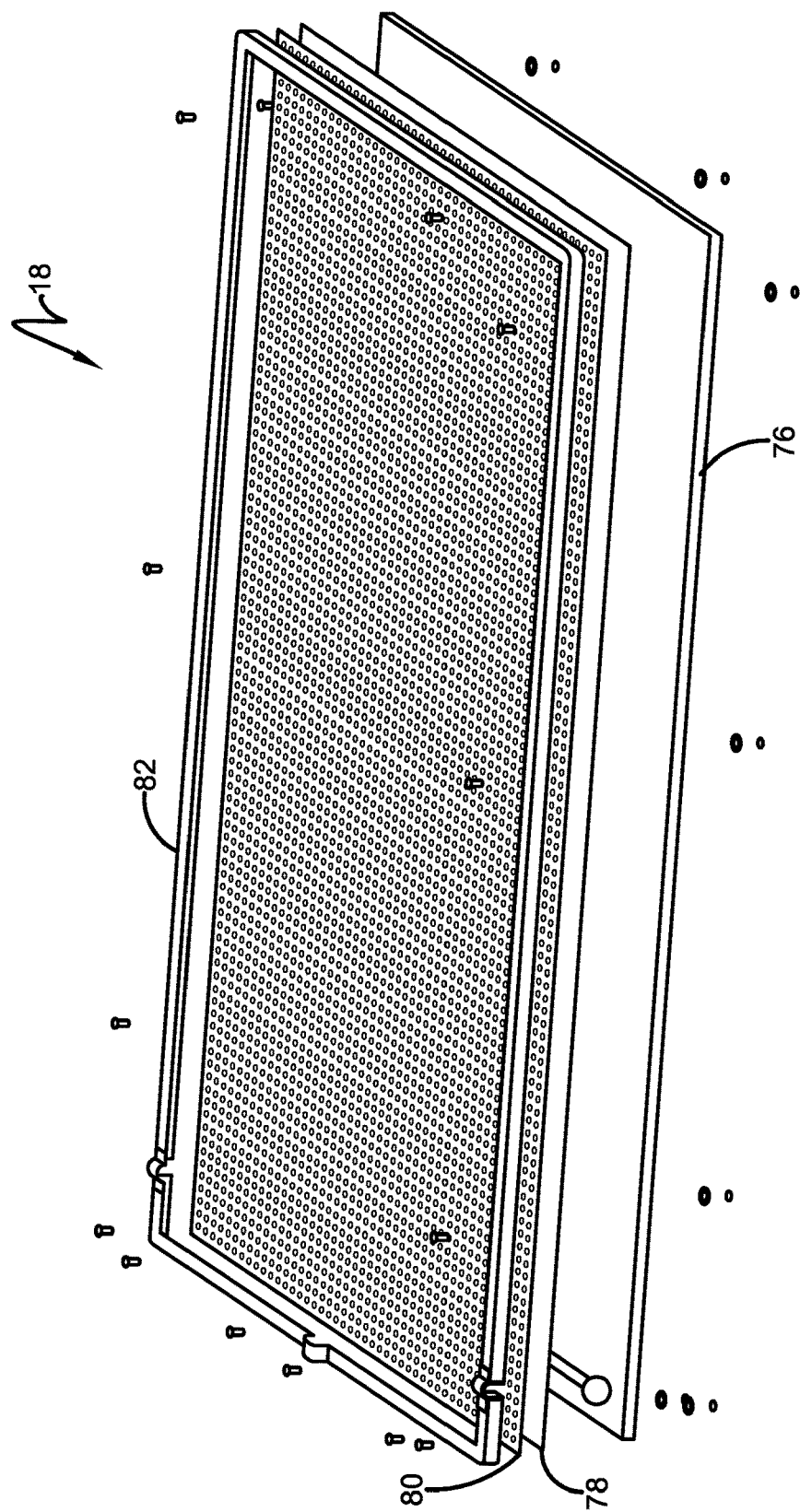
FIG. 10 is an assembly view of a burn plaque made in accordance with the invention.

The transportable, wireless igniter boxes 20 are intended to operate with burn plaque assemblies 18, such as shown and described in FIGS. 10-12. As shown, each burn plaque assembly preferably comprises a marine-grade plywood base 76 of 7/16-3/4 inch, and most preferably 1/2 inch, thickness and of standard plywood size of 4'×8'. Each of the pieces of plywood is preferably covered with a fiberglass cloth having a characteristic density of 8-12 ounces, and most preferably 10 ounces. Above the plywood/fiberglass cloth base 76 is a woven roving fiberglass mat 78, typically having a characteristic density of 18-30 ounces, and most preferably being a 24-ounce woven roving fiberglass mat. Above the mat 28 is placed a stainless steel sheet 80, being 18-26 gauge, and preferably on the order of 22 gauge. Most preferably, the stainless steel sheet 80 is penetrated with holes for gas passage, the holes preferably having a diameter of 3/32 inch and being spaced apart by 5/32 inch on centers. While the base has been described as being of plywood, it may be of steel plate construction on the order of 14-18 gauge, or of a ceramic, such as aluminum oxide.

A frame member 82 is screwed to the plywood base 76 to provide the physical structure of the burn plaque 18 as a composite sandwich of materials.

As best shown in FIGS. 11 and 12, a gas line matrix 84 is positioned between the base member 76 and the woven roving fiberglass mat 78. The gas line matrix 84 is formed of appropriately interconnected short nipples and elongated pieces, joined with appropriate tees. The exposed ends of the short nipples are either provided with couplings or caps at 86. Couplings may be employed if that part of the matrix is to be connected to an adjoining matrix or to an incoming gas line. Otherwise, the ends of the nipples are capped at 86. Elongated pipes 88, 90 are provided internally of the sandwich structure of the burn plaque 18, being connected at one end by appropriate tees and being sealed at the opposite ends. Each of the elongated pipes 88, 90 is perforated along its length for gas escapement. The apertures in the elongated pieces 88, 90 are typically spaced 4"-12", and most preferably 8", apart and would typically have a diameter of 1/16-1/8 inch, and most preferably 3/32 inch.

It will be appreciated that the burn plaques operate to receive gas as from the supply 12 through an appropriate coupling of one or more of the nipples connected to the elongated pieces 88, 90. The gas is emitted from the perforations or holes within the pieces 88, 90. With a transportable, wireless igniter box 20 being placed nearby, the gas that is emitted from the pipes 88, 90 and diffused through the woven roving 78 and out of the perforated sheet 80 is ignited at an appropriate time during the training session when the associated gas valve is opened under control of the operator.

Those skilled in the art will appreciate that an array of burn plaques 18 used in association with transportable, wireless igniter boxes 20 may be readily employed to fashion any of numerous layouts of fire that might be encountered by emergency workers. The burn plaques are extremely low profile, having a thickness or height on the order of 1-2 inches, and the igniter boxes 20 emit a flameless ignition spark, rather than a flame, and are given to continuous operation in the most hostile of environments. The burn plaques 18 provide good diffusion of the propane gas, dependent upon the arrangement of the elongated pieces 88, 90, with the gas being more evenly diffused than when simply bubbled through water. The burn plaques 18 can be configured in any of numerous arrangements of interconnection and can be fashioned in any of various sizes. Accordingly, replications of a wide variety of real-life fire emergency situations can be developed using the system of the invention with assembly being simple, rapid, and cost effective, and with the operation thereof being reliable and not given to failure or extinguishment.

Thus, it can be seen that the aspects of the invention have been satisfied by the structures presented above. While in accordance with the patent statutes, only the best mode and preferred embodiments of the invention have been presented and described in detail, the invention is not limited thereto or thereby. Accordingly, for an appreciation of the true scope and breadth of the invention, reference should be made to the following claims.

What is claimed is:

1. A fire trainer system, comprising:
   an array of waterless burn plaques in selective communication with a source of combustible gas;
   a flameless igniter associated with each burn plaque, each said flameless igniter igniting said combustible gas emitted from said associated burn plaque; and
   wherein said flameless igniter is connected to a high-voltage coil driven by a pulse generator, said pulse generator being activated by a battery, said igniter, battery, high-voltage coil, and pulse generator being maintained by a box, and wherein said igniter extends from an interior to an exterior of said box, and further comprises a shield covering an external portion of said igniter.

2. The fire trainer system according to claim 1, further comprising a valved manifold interposed between said source of combustible gas and said array of burn plaques and effecting said selective communication.

3. The fire trainer system according to claim 1, further comprising a switch interposed between said battery and said pulse generator, said switch selectively interconnecting said pulse generator with said battery.

4. The fire trainer system according to claim 3, wherein said pulse generator is configured to emit pulses of a predetermined amplitude and frequency.

5. The fire trainer system according to claim 1, wherein said box is of external metallic construction having fireproof panels affixed to internal surfaces thereof.

6. The fire trainer system according to claim 1, wherein said shield is semi-cylindrical.

7. The fire trainer system according to claim 1, further comprising an enclosure extending from an exterior wall of said box, said enclosure containing said switch and a battery charging connector.

8. The fire trainer system according to claim 7, wherein said enclosure is selectively accessible by removal of a threaded cap.

9. A fire trainer system, comprising:
- an array of waterless burn plaques in selective communication with a source of combustible gas;
- a flameless igniter associated with each burn plaque, each said flameless igniter igniting said combustible gas emitted from said associated burn plaque; and
- wherein said burn plaques comprise a base receiving thereon a gas line matrix, at least a portion of said matrix of gas line having gas-emitting apertures therein, and a fiberglass woven roving mat covering said base and matrix of gas line.

10. The fire trainer system according to claim 9, wherein said igniter extends from an interior to an exterior of box, and further comprises a shield covering an external portion of said igniter.

11. The fire trainer system according to claim 9, further comprising a perforated steel sheet covering said woven roving mat.

12. The fire trainer system according to claim 11, further comprising a frame secured to said base and sandwiching said gas line matrix, woven roving and perforated steel sheet therebetween.

13. The fire trainer system according to claim 9, wherein said array of waterless burn plaques is configured to replicate a specifically contemplated fire hazard.

14. The fire trainer system according to claim 13, wherein said box has a carry handle and no external hard wiring or gas line plumbing connected to said box.

* * * * *